United States Patent
Wyllie, III

(10) Patent No.: US 6,222,911 B1
(45) Date of Patent: Apr. 24, 2001

(54) PROGRAMMABLE ACCESS CARRIER SELECTION TERMINAL

(75) Inventor: Alfred Scales Wyllie, III, Apex, NC (US)

(73) Assignee: Nortel Networks Limited, Montreal (CA)

(*) Notice: Subject to any disclaimer, the term of this patent is extended or adjusted under 35 U.S.C. 154(b) by 13 days.

(21) Appl. No.: 09/129,724

(22) Filed: Aug. 5, 1998

(51) Int. Cl.[7] .................................................. H04M 15/00
(52) U.S. Cl. ........................ 379/112; 379/130; 379/140; 379/115
(58) Field of Search .......................... 379/111–115, 120, 379/121, 127, 130, 133–134, 221, 219–220

(56) References Cited

U.S. PATENT DOCUMENTS

| | | | |
|---|---|---|---|
| 4,791,665 | * | 12/1988 | Bogart et al. . |
| 4,866,763 | * | 9/1989 | Cooper et al. . |
| 5,550,910 | * | 8/1996 | DeJager ................................ 379/220 |
| 5,781,620 | * | 7/1998 | Montgomery et al. . |
| 5,878,122 | | 5/1999 | White et al. .......................... 379/115 |
| 5,881,139 | * | 3/1999 | Romines ............................... 379/130 |

\* cited by examiner

*Primary Examiner*—Duc Nguyen
(74) *Attorney, Agent, or Firm*—Steven B. Phillips; Moore & Van Allen, PLLC

(57) ABSTRACT

Customer premises equipment (CPE) which allows a user programmable access carrier selection. Users can program one or more alternate access carriers to use at different times and/or different days of the week. After the feature has been programmed, the CPE determines which access carrier to use and inserts the appropriate alternate access code prior to releasing the dialed digits. The invention allows a telephone customer to take advantage of varying rates and promotional programs without having to remember the details of each provider's plans and the provider access codes for each call.

7 Claims, 9 Drawing Sheets

PROGRAMMABLE ACCESS CARRIER SELECTION TERMINAL

CROSS-REFERENCE TO RELATED APPLICATION

This application is related to copending, commonly assigned application Ser. No. 09/129,159, entitled, "Programmable Access Carrier Selection Through Network Feature Control", which was filed on the same day as the present application and which is incorporated herein by reference.

BACKGROUND

1. Field of the Invention

The present invention relates to carrier access from customer premises equipment (CPE) through a central office switch in a public switched telephone network (PSTN). More particularly, the invention is related to ways in which the CPE can be programmed by a user to access alternate carriers in accordance with particular conditions.

2. Description of the Problem Solved

The evolution of the public telephone system and the telecommunication business over the last two decades has presented consumers with a myriad of choices. Prior to deregulation, the telephone customer procured telephone service from a local company, and long distance service from a different arm of the same company. Fairly early on, competition for long distance service was introduced. At first, customers who wished to use an alternate long distance carrier had to use an access code at all times. After deregulation, telephone customers were given the opportunity to choose a long distance carrier to be a default carrier whenever the customer made a call. Today, telephone customers have a default carrier, but may also choose an alternate access carrier by dialing a specific access code. The advent of competition between local and long distance telephone carriers has resulted in even more options for the customer in choosing a carrier. Other factors such as monthly charges, point of billing increment, special promotional programs, and minimum duration of the call also affect the cost of the call.

Today, a customer may select one pre-subscribed carrier and change the carrier on a per call basis, by dialing an alternate five or seven digit access code prior to making a call. However, in order for the average telephone customer to make an informed choice as to what carrier to use for a given call, the customer must refer to or remember which carriers are less costly for a given time of day or day of the week, remember the appropriate access code to select a particular carrier, and manually dial the access code prior to making a call. What is needed is a way for a user to preprogram alternate access codes into his or her CPE, along with information on when to use each code. Ideally, this capability should be accessible to all customers regardless of location or the type of switch through which the customer is connected to the network. It is also important that the telephone customer have complete control over which access carrier is used at any given time.

SUMMARY

The present invention solves the problem described above by providing customer premises equipment (CPE), where the feature can be used to program one or more alternate access carriers to use at different times and different days of the week. After the user programs this feature, when the user originates a call requiring an access carrier, the CPE determines which access carrier to use, and sends an access code so a central office switch can route the call. The user can override this feature by preceding the original directory number with an alternate carrier access code which will take precedence. For time periods not programmed, no access code is supplied, and the pre-subscribed access carrier will be used. The invention allows a telephone customer to take advantage of varying rates, programs, and advantages of different carrier's without having to remember all the details of the various carriers billing plans for each call. The telephone customer is also relieved of the burden of remembering which access code goes with which carrier each time he or she makes a call.

The present invention meets the above need by providing a method of programming customer premises equipment (CPE) for alternate access carriers in response to user input. This CPE may be customer terminal equipment such as a telephone, or an external device designed to carry out the function of the invention. In either case, the term "CPE" refers to the apparatus which carries out the invention. According to the present invention the CPE collects and stores digits representing specific time periods. The CPE then collects and stores one or more alternate carrier codes wherein each of the alternate carrier access codes is associated with one or more of the specific time periods. Optionally, multiple programs may be entered, each program containing specific time periods and specific alternate carrier access codes. The specific time periods may include specific times of specific days.

When a user initiates a call for the CPE, the CPE first determines if the call is a toll call. If so, the CPE determines the current time period and retrieves alternate carrier access data for the current time period. The CPE then selects the appropriate alternate access carrier based on the alternate carrier access data. Optionally, the CPE may override its program whenever it receives a carrier code which has been entered with a called number by the user.

As previously mentioned, the invention may be implemented in a terminal device such as a telephone, or any separate device which is connected to a network and which performs the function of the invention. In either case I refer to such device as customer premises equipment. In any case, in the preferred embodiment, the device includes a network interface, and an input/output block which includes a display for user feedback, and optionally includes a keypad for entering numbers. The device also includes a control block for controlling the functions of the CPE. The control block is connected to the network interface and the input output block. The control block is also connected to a memory which includes program code for causing the CPE to implement the present invention. If the device is a digital telephone, it also includes an encoder/decoder through which the device is connected to a telephone handset.

DETAILED DESCRIPTION OF A PREFERRED EMBODIMENT

Figure 1:
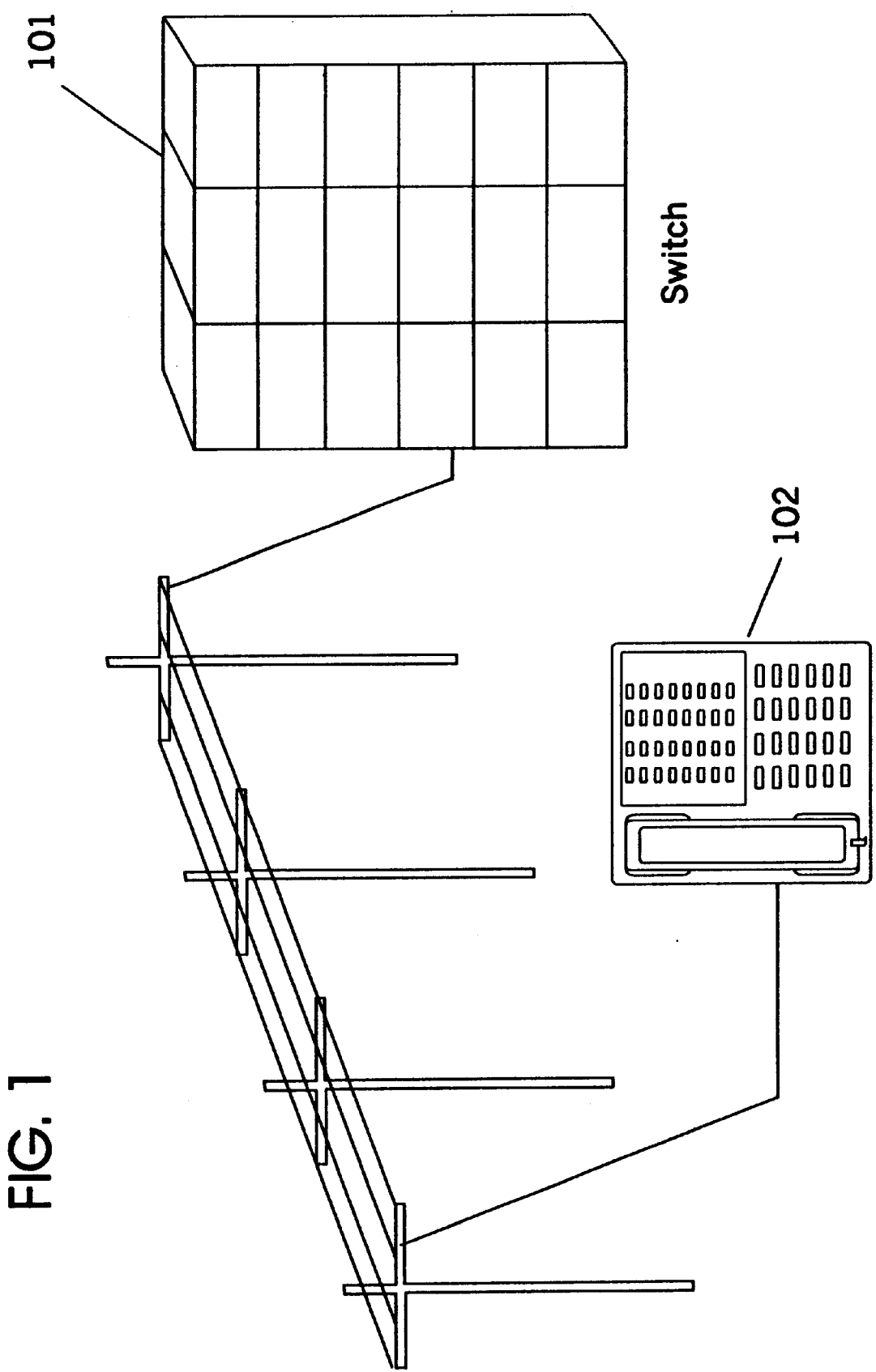
FIG. 1 is a network diagram which illustrates a central office switch connection to a CPE which implements the present invention.

FIG. 1 illustrates the operating environment of the present invention. According to FIG. 1 the customer premises equipment (CPE) 102, for example, a telephone, is connected to a central office telephone switch 101 via the public switched telephone network (PSTN). CPE 102 includes computer program code and various hardware components which implement the present invention. The computer program code and hardware components are described in further detail below.

Figure 2:
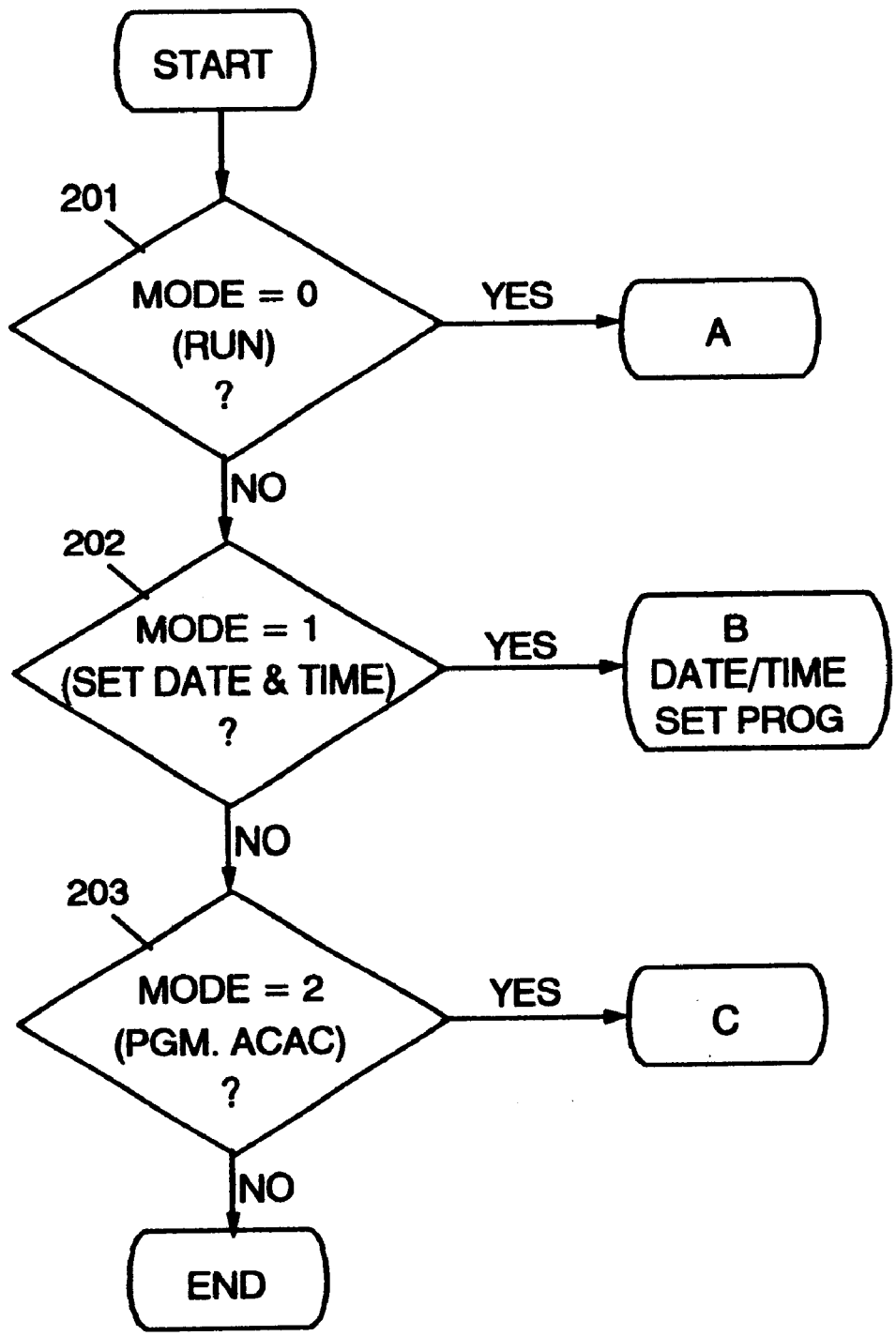
FIG. 2 illustrates a flow chart which shows how a CPE determines an operating mode according to the present invention.

FIG. 2 shows a rotational decision flow chart for determining the operating mode of the CPE of the present invention. In the preferred embodiment, the operating mode is determined by a switch on the CPE. A determination is made at 201 as to whether the operating mode is a "run" mode which I call mode 0. If the switch is in the run mode position, processing branches to A in FIG. 8 which is discussed below. If the mode selected is not the run mode, a determination is made at 202 if the mode is a "set date and time" mode which I call mode 1. If so, processing branches to B. This is a routine for setting the date and time of a CPE internal clock. This routine includes setting the hour, setting the minutes, setting the day, month, and year. Days and months are assigned keypad numbers, and a user inputs the date and time in a fashion similar to setting the date and time on a video cassette recorder or answering machine. If the mode switch on the CPE is not set to mode 0 or mode 1 a determination is made at 203 as to whether it is set to mode 2, for programming the alternate carrier access codes. If so, the program branches to a routine to set the alternate carrier access codes at C, as described in FIG. 3, discussed below.

Figure 3:
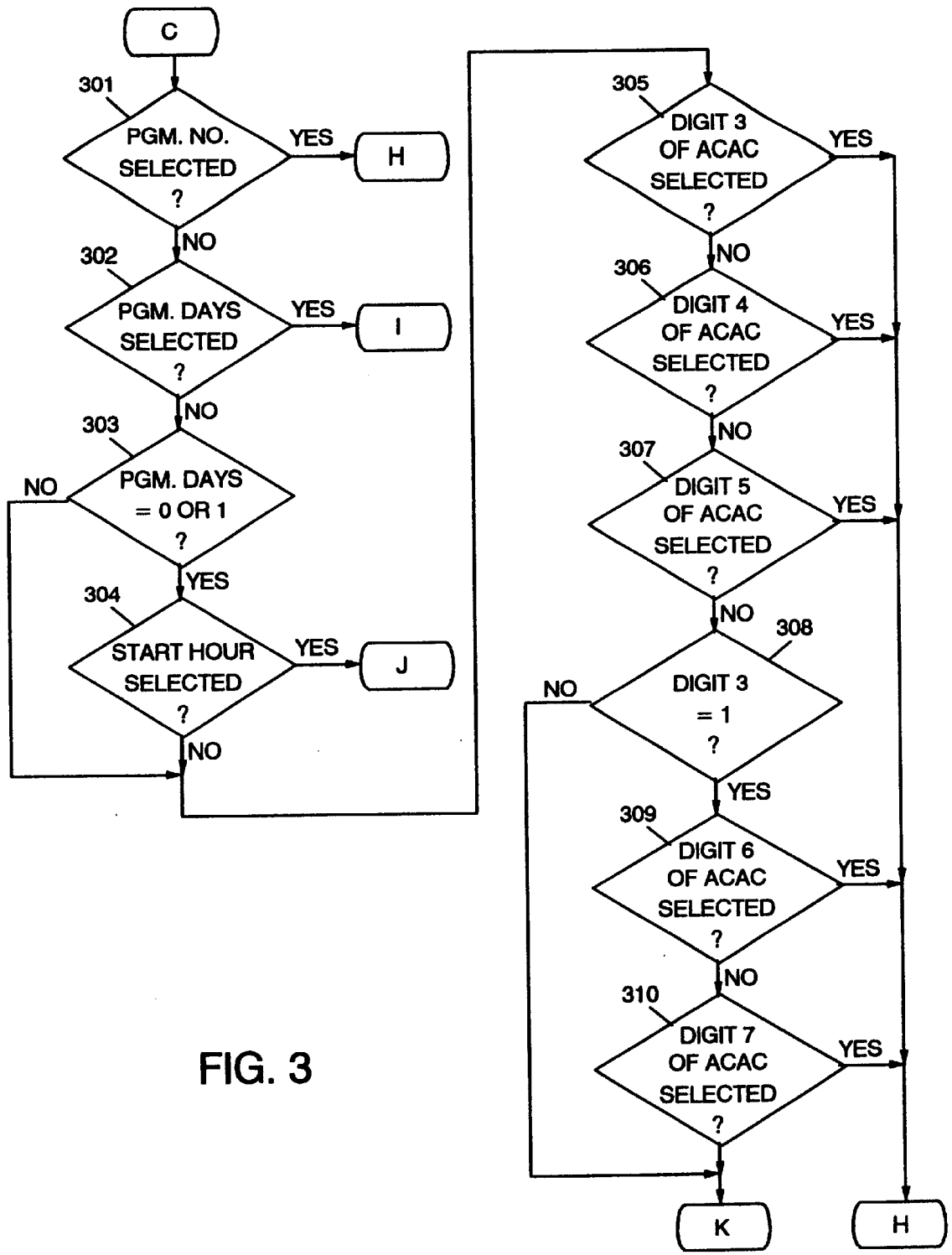
FIG. 3 shows a high-level flow chart which illustrates how alternate carrier access codes are programmed according to the present invention.
Figure 4:
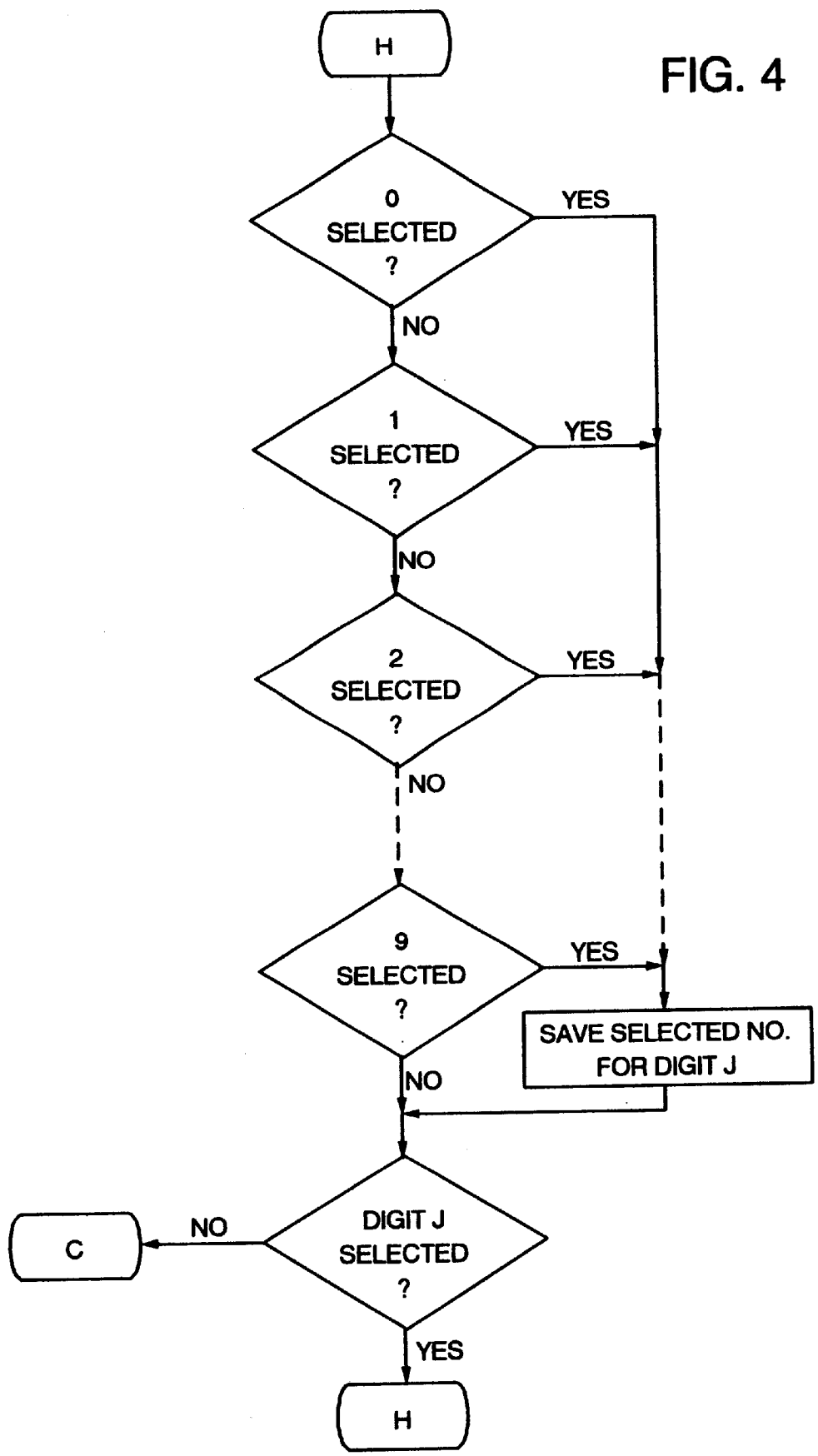
FIG. 4 is a flow chart illustrating further detail of the process by which alternate carrier access codes are programmed according to the present invention.
Figure 5:
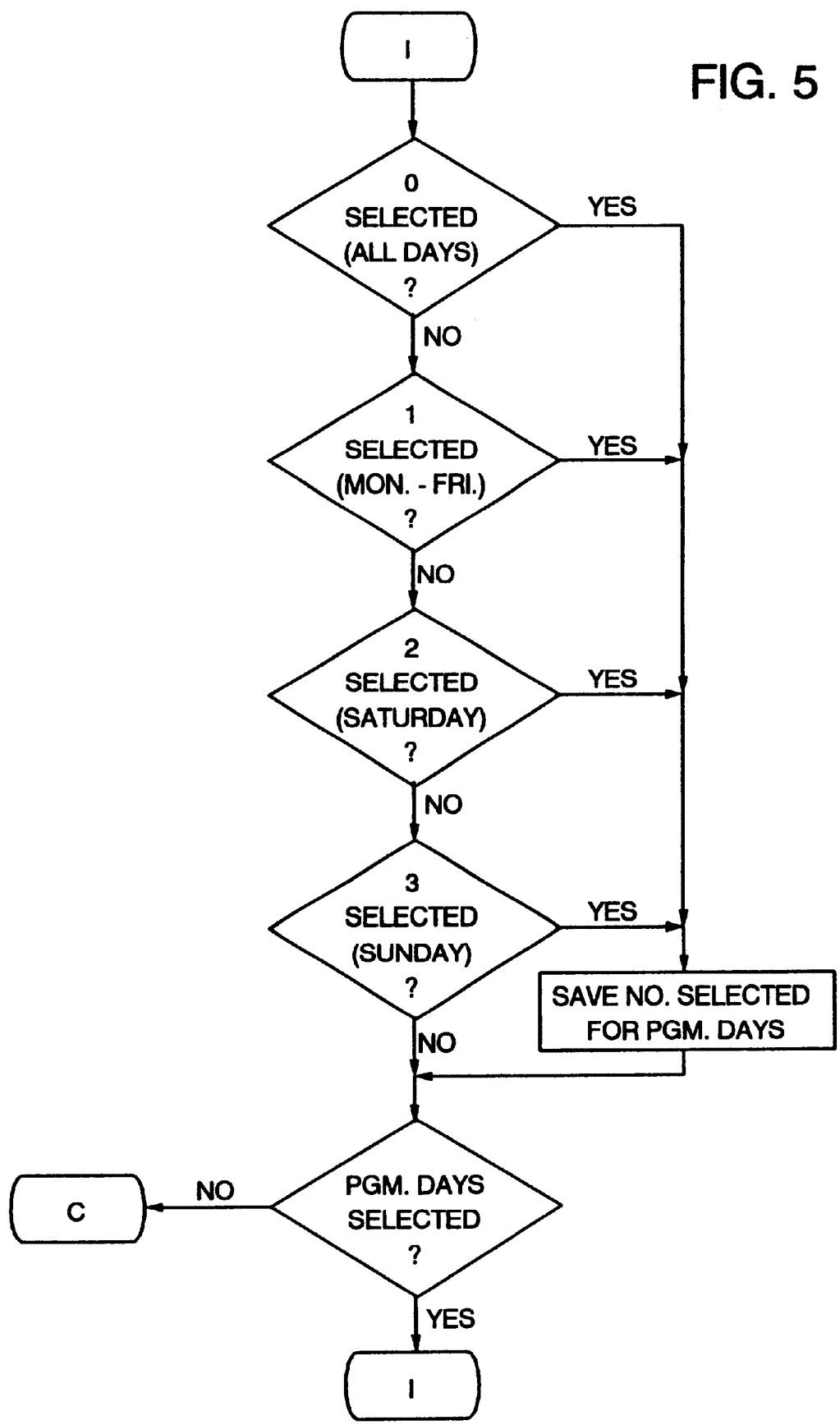
FIG. 5 is a flow chart illustrating further detail of the process by which alternate carrier access codes are programmed according to the present invention.

FIG. 3 depicts the flow that occurs with the mode switch set to program the alternate carrier access codes. One or more programs may be entered. In this example, up to 10 programs may be selected. At 301 the program number is selected, resulting in a branch to H, for the processing shown in FIG. 4. As long as the program number is selected, the flow will loop. The last program number entered is selected and saved for later use. At 302, the programmed days are selected and the program branches to I for processing as shown in FIG. 5. FIG. 5 depicts the flow for determining which day or group of days is used for the selected program number. The codes for these days are saved for later use. In this example 0 equals all days, 1 equals Monday through Friday, 2 equals Saturday, and 3 equals Sunday.

Figure 6:
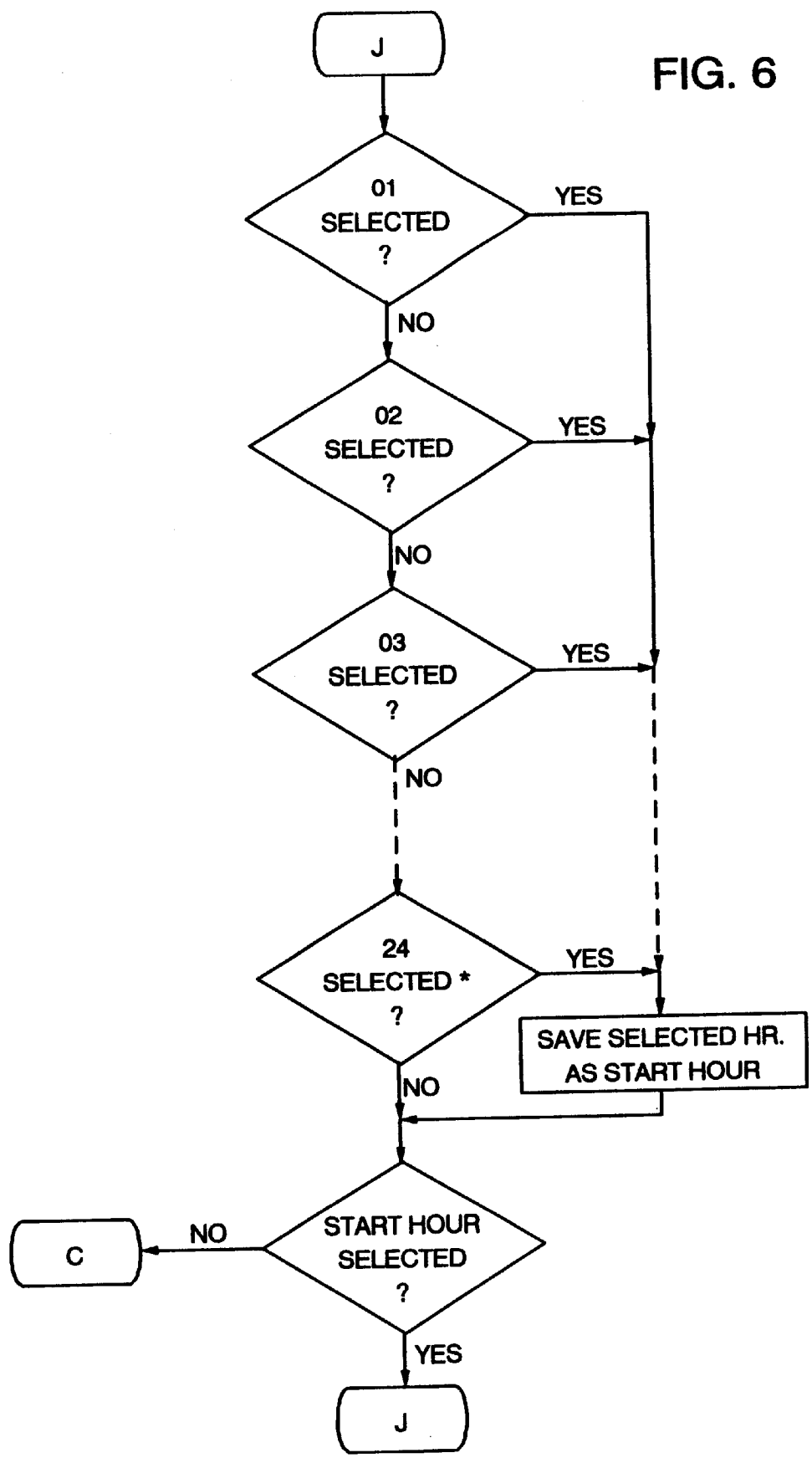
FIG. 6 is a flow chart illustrating further detail of the process by which alternate carrier access codes are programmed according to the present invention.

And in this example, at 304 of FIG. 3 a start time or start hour for using a particular carrier access code is selected. Also in this example, the start time selection is only invoked if the program days include Monday through Friday, as determined at 303. Many access carriers do not have rate changes during the day on Saturday or Sunday, and this design makes it easier for the user to input the alternate carrier access codes for these carriers. There are many alternate designs which could request start hours for any day of the week. Also in this example, no stop hour is selected. Rather, a particular selection stops at the end of the day. A person of ordinary skill in the art can easily design a system to accept both start hours and stop hours on any day of the week. In this example, the program branches at 304 to J for processing shown in FIG. 6. FIG. 6 shows how a user will input a start hour based on a 24-hour clock. In this example, the user is not required to input exact minutes, since most carriers cannot change billing rates other than on the hour. However again, one of ordinary skill in the art could design a system to include hours and minutes. One could also design a system to use a 12-hour clock, or to allow a user to switch between using a 12-hour clock and a 24-hour clock.

The first two digits of the alternate carrier access code are always 10 in this example and cannot be selected by the user. This restriction simplifies the entering of the codes. An alternate design allows a user to input these digits before the rest of the digits of the access codes. In this design, when the third digit is selected by the user, the flow chart of FIG. 3 shows how the value of the digit is saved. At 305, 306, and 307 digits 3 and 4 and 5 are input or selected by the user. If digit 3 has a value of "1", the access code will be a 7-digit code and digits 6 and 7 are selected and their values saved in a similar manner at 309 and 310. If digit 3 has a value other than 1, than the access code will be a five digit code, and digits 6 and 7 will not be accepted.

Figure 7:
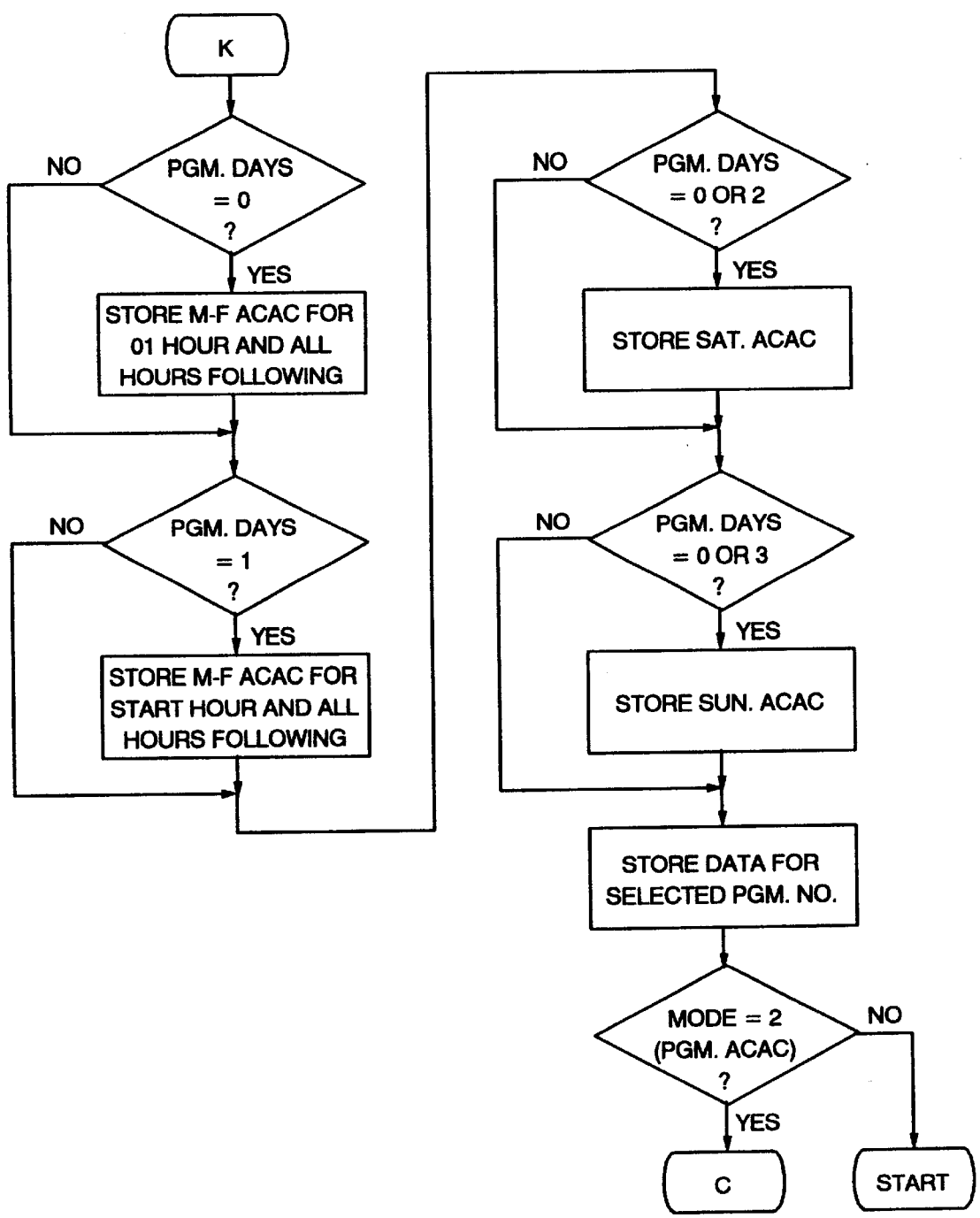
FIG. 7 is a flow chart illustrating more detail of the process by which alternate carrier access codes are programmed according to the present invention.

After the programming selections have been made as shown in FIG. 3 the values from the selections will be stored at K, the processing for which is shown in FIG. 7. If the program day selection was for "all days", then the alternate carrier access code will be stored for each hour of the day in a "Monday through Friday" alternate carrier access code storage area. If the programmed selection was for Monday through Friday, the alternate carrier access code will be stored for the start hour that is saved for each hour of the day following the start hour. In this example embodiment, the customer may program multiple programs for the same group of days by entering the different start hours in sequential order, beginning with the earliest start hour, using a different program number for each hour entered. When a later start hour is saved, it will override any previously stored values for following hours. If the program days selection was for "all days", the alternate carrier access code is stored in the stored locations for Saturday and Sunday. If the programmed day selection was for Saturday or Sunday, the alternate carrier access code will be stored in the respective storage location, as described below. The data saved for each program number is also saved for later review or display if the program number is selected again.

Both the program which implements the invention and the alternate carrier access code data as described above are stored within a memory, media, or other type of storage device within the CPE which implements the present invention. For the preferred embodiment described, storage would have to be adequate for 24 5-digit fields for Monday to Friday alternate carrier access codes, and two 5-digit fields for Saturday and Sunday alternate carrier access codes, 10 tuples for program numbers with space for program days, start hours, 5-digit fields for alternate carrier access codes, and real-time clock information. The amount of storage for program numbers and specific program information will vary with the number of programs supported.

Figure 8:
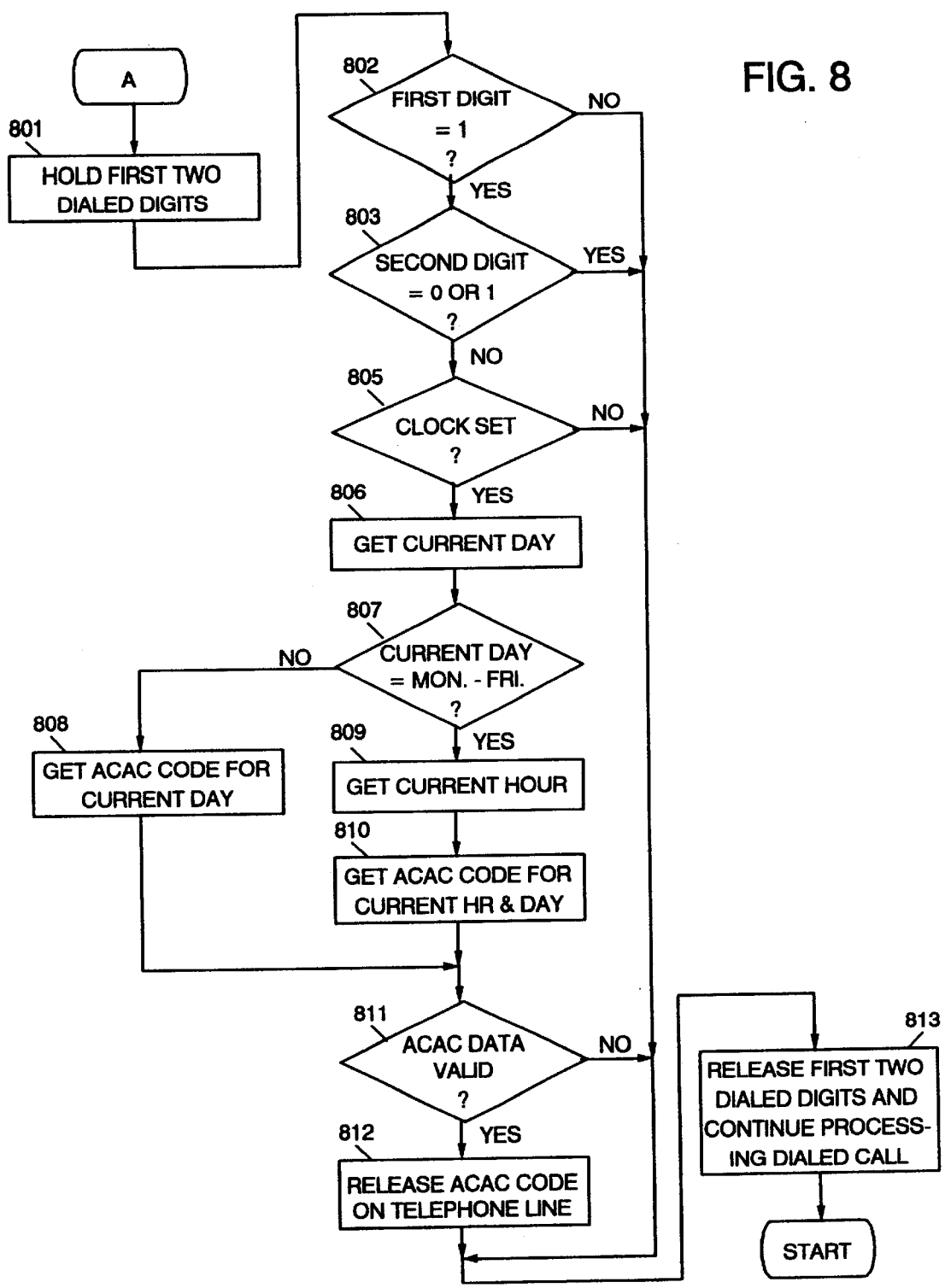
FIG. 8 is a flow chart which illustrates how the invention determines an alternate access carrier when a user places a call.

FIG. 8 illustrates the process of determining whether to dial an alternate carrier access code, and selecting the code, when a user initiates a call using the CPE of the present invention. The process begins at A. Initially, at 801, the CPE waits for the first two dialed digits until a determination can be made on inserting an alternate carrier access code. It the first digit is not a "1", the call will not be a national toll call and the held digits will be released. If the first digit is a "1" and the second digit is a "0", the customer is dialing an alternate carrier access code, which is to override any such code stored, and the digits will be released. It the first digit is a "1" and the second digit is a "1", the call is not a national toll call and the digits are released. The first digit determination is made in 802, and the second digit determination is made at 803.

At 805 the internal clock is checked to see if it has been set. If not, the held digits are released. If the clock has been set, the current day is retrieved at 806 and queried at 807 to determine if it is in the Monday through Friday group. If not, the alternate carrier access code for the current day, be it Saturday or Sunday, is retrieved from the preprogrammed storage area at 808. If the current day is within the Monday through Friday group, the current hour is queried and used to retrieve the alternate carrier access code at 809 and 810. Optionally, at 811 the alternate carrier access code can be checked to determine its validity. At 812 the leading digits are inserted at the beginning of the retrieved code and the entire code is inserted on the telephone line followed by the first two dialed digits that were originally held at 813. Call processing then continues with the rest of the digits simply being sent out to the central office switch.

Figure 9:
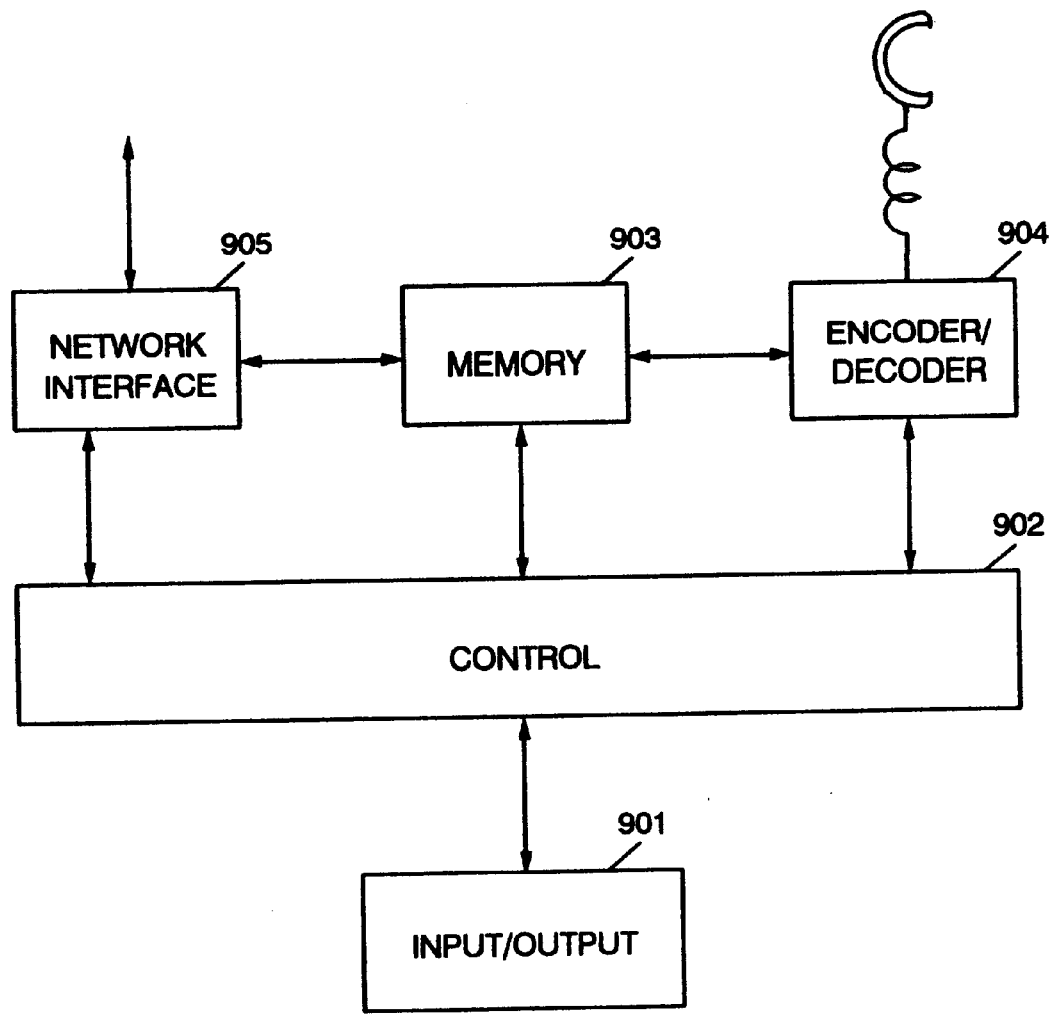
FIG. 9 is an example block diagram of the CPE which implements the present invention.

FIG. 9 is a block diagram of a CPE according to the present invention. The CPE of FIG. 9 is interfaced to the telephone network by the network interface block 905. If the CPE is a telephone as opposed to a separate device which implements the invention, encoder/decoder 904 connects the CPE to handset. If the CPE is a digital telephone, the encoder/decoder is a CODEC of the type typically used in digital telephones. An input/output block 901 provides a way for a user or operator to control the operation of a device and to input data. This input/output block 901 includes a keypad and usually an LCD display. The keypad is used to input the alternate carrier access code data. If the CPE is a telephone, this keypad is also used to dial numbers in the normal fashion.

In the preferred embodiment, the operation of the CPE is controlled by the control block 902 using program code which resides in the memory 903. It is this program code which implements the invention. The control block 902 includes a microprocessor or microcontroller, and supporting circuitry. The control block 902 is connected to all other elements of the CPE. The memory 903 can be a magnetic storage device, but is more typically a semiconductor memory device or an array of semiconductor memory devices such as programmable read-only memory (PROM), erasable programmable read-only memory (EPROM), or flash memory, or a combination of memory devices. Memory 903 is also used to store alternate carrier access code data, which is captured and saved according to the present invention. Memory 903 is also used to temporarily store data which is collected by the encoder/decoder, and so it is connected to the encoder/decoder if the encoder/decoder is present, as well as to the control block 902. It should be noted that in addition to the program code of the present invention, program code contained in memory and executed by control block 902 controls the other functions of the CPE. These functions are dependent on the type of CPE which is making use of the invention.

The foregoing description of the CPE is shown as an example only. There are numerous other possible embodiments of the device. For instance, although in the above example I described a control block and memory as forming the means for controlling the operation of the device, other types of circuitry can be used. Indeed, the functions can be entirely performed by a special purpose semiconductor chip or chipset. One or more gate arrays, programmable logic arrays, or other similar programmable semiconductor devices can be used. The functions might also be performed by discrete circuitry. Also, the entire CPE can be formed as an adapter card for a computer or workstation, as opposed to a self-contained, stand-alone box. In this case, the interfaces would include a bus connector. In fact, the CPE does not have to be a device that only performs one function.

I have described specific embodiments of my invention, and specific environments in which it is used. The foregoing descriptions are no way intended to limit the scope of the appended claims. A person of ordinary skill in the art will quickly recognize there are numerous applications of my invention.

I claim:

1. At a telephone terminal which includes a keypad for entering telephone numbers by a user, a method of selecting a preprogrammed access carrier in response to a call being placed by the user, the method comprising the steps of:

determining if the call is a toll call;

determining a current time period if the call is a toll call;

retrieving an alternate carrier access code for the current time period, based on the alternate carrier access code having been entered by the user through the keypad at an earlier time;

determining if the alternate carrier access code is valid;

if the alternate carrier access code is valid, automatically dialing the alternate carrier access code so that the call is placed using an alternate access carrier corresponding to the alternate carrier access code; and if the alternate carrier access code is not valid, placing the call without dialing any alternate carrier access code.

2. The method according to claim 1, the method further comprising the steps of:

first, determining if an override carrier code has been entered by the user through the keypad for the call; and completing the call with the override carrier code.

3. Telephone terminal equipment which can be programmed for alternate access carriers in response to digits entered by a user, the telephone terminal equipment comprising:

a telephone network interface having a network connection;

an input/output block including a keypad through which the user can enter the digits as well as telephone numbers;

a control block for controlling the functions of the telephone terminal equipment, the control block being connected to the telephone network interface, the input/output block, and an encoder/decoder; and a memory connected to the encoder/decoder, the control block, and the telephone network interface, the memory including program code for collecting and storing the digits entered by the user through the keypad, the digits representing specific time periods, and one or more alternate carrier access codes as entered by the user through the keypad, wherein each of the one or more alternate carrier access codes is associated with one or more of the specific time periods.

4. The telephone terminal equipment of claim 3 wherein the memory further includes program code for collecting a program number with which the specific time periods are to be associated.

5. Telephone terminal equipment through which a pre-programmed access carrier can be selected in response to a call being placed by a user, the telephone terminal equipment comprising:

a telephone network interface having a network;

an input/output block including a keypad through which the user can enter the digits as well as telephone numbers;

a control block for controlling the functions of the telephone terminal equipment, the control block being connected to the network interface, the input/output block, and an encoder/decoder; and a memory connected to the encoder/decoder, the control block, and the network interface, the memory including program code for determining if the call is a toll call, determining a current time period, retrieving an alternate carrier access code for the current time period, based on the alternate carrier access code having been entered by the user through the keypad at an earlier time, determining if the alternate carrier access code is valid and automatically dialing the alternate carrier access code so that the call is placed using an alternate access carrier corresponding to the alternate carrier access code if the alternate carrier access code is valid.

6. The telephone terminal equipment according to claim 5 wherein the memory further includes program code for first determining if an override carrier code has been entered by a user through the keypad with a called number.

7. Apparatus which includes a keypad for entering telephone numbers by a user comprising:

means for determining if a call being made by a user is a toll call;

means for determining a current time period;

means for retrieving an alternate carrier access code for the current time period, the alternate carrier access code having been entered by the user through the keypad at an earlier time;

means for determining if the alternate carrier access code is valid;

means for automatically dialing the alternate carrier access code so that the call is placed using an alternate access carrier corresponding to the alternate carrier access code if the alternate carrier access code is valid; and means for placing the call without dialing any alternate carrier access code if the alternate carrier access code is not valid.

\* \* \* \* \*